United States Patent [19]

Homer, III et al.

[11] 3,763,380
[45] Oct. 2, 1973

[54] METHOD AND APPARATUS FOR MEASURING RATES OF RANDOM PULSES

[75] Inventors: John C. Homer, III, Willoughby; John R. Stock, Fairview Park, both of Ohio

[73] Assignee: Stock Equipment Company, Cleveland, Ohio

[22] Filed: May 5, 1971

[21] Appl. No.: 140,519

[52] U.S. Cl............ 307/234, 250/43.5 D, 250/83.6, 307/233, 324/71 CP, 324/78 D, 328/109, 328/129, 328/140
[51] Int. Cl. ............................................ H03k 5/20
[58] Field of Search...................... 250/43.5 D, 83.6, 250/83.6 W; 307/232, 233, 234; 324/71 CP, 78 Q, 78 Z; 328/109, 129, 140

[56] References Cited
UNITED STATES PATENTS 3,551,672 12/1970 Homer et al. ............... 250/83.6 R X
3,473,130 10/1969 Briggs ................................. 328/109

OTHER PUBLICATIONS

Prot, Time Interval Detecting Device, IBM Technical Disclosure Bulletin, April 1965, pp. 1111, 1112.
Thompson, Time Interval Detection Circuit, IBM Technical Disclosure Bulletin, January 1967, pp. 983, 984.
Burke et al., Electrical Filter, IBM Technical Disclosure Bulletin, February 1970, pp. 1369, 1370.

*Primary Examiner*—Stanley T. Krawczewicz
*Attorney*—Bosworth, Sessions, Herrstrom & Cain

[57] ABSTRACT

Method and apparatus for measuring the amount of material in a conduit by detecting the relative strength of radiation passing through the conduit. Method and apparatus for determining rates of random pulses by comparing the interval between successive random pulses to a predetermined interval and providing electrical pulses (down pulses) when the interval is greater than the predetermined interval, and other electrical pulses (up pulses) when the interval is less than the predetermined interval. The down pulses are provided at a minimum rate when the interval between successive radiation pulses is much longer than the predetermined interval. A high voltage power supply having a clamping zener diode in series between a regulating zener diode and an output filter capacitor to clamp the capacitor to the peak voltage across the regulating zener diode. A bleeder resistor across the regulating zener diode provides a discharge path for the output capacitor through the zener impedance of the clamping zener diode when the supply is turned off. A variable impedance clamping circuit including a zener diode and a conventional diode connected in series so that the zener diode is reverse biased and the conventional diode is forward biased. The series diodes clamp pulses of large amplitude to an acceptable level and provide increasing impedance to pulses of smaller amplitude.

10 Claims, 5 Drawing Figures

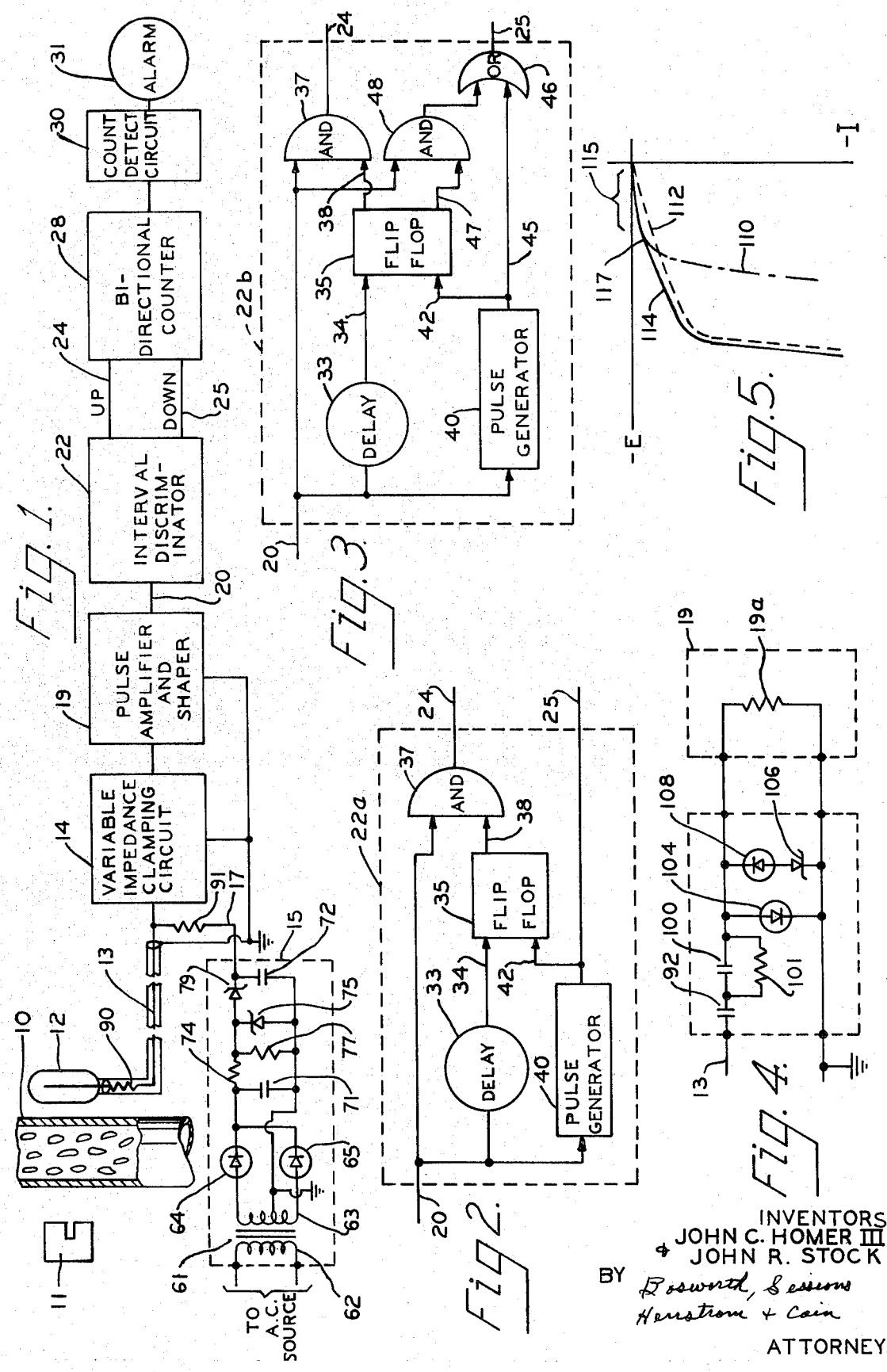

METHOD AND APPARATUS FOR MEASURING RATES OF RANDOM PULSES

BACKGROUND OF THE INVENTION

This invention relates to method and apparatus for measuring the amount of material in a conduit, such as the presence or absence of coal in a conduit through which the coal flows, and the actuation of an alarm or control if the amount of material in the conduit goes below a predetermined minimum. The invention includes improvements in method and apparatus for discriminating between rates of pulses that occur randomly in time, such as pulses derived from emissions by radioactive materials, which may be used in conjunction with an alarm or control system of the type mentioned above. Other aspects of the invention include the provision of a novel high voltage power supply such as for Geiger tubes and the like, and the provision of a novel variable impedance clamping circuit both of which may be used advantageously in the measuring apparatus mentioned above.

U.S. Pat. No. 3,551,672 to John C. Homer III and John R. Stock, issued Dec. 29, 1970 illustrates apparatus that includes a source of radiation and a detector unit placed on opposite sides of a conduit through which coal flows on its way to a furnace. The amount of radiation reaching the detector is roughly proportional to the mass of material between the radiation source and the detector. When less than a predetermined amount of coal is in the conduit between the radiation source and the detector, the amount of radiation received by the detector will increase above a predetermined value. When this occurs, circuits associated with the detector actuate an alarm to warn personnel or activate controls to prevent damage to the system. Similar systems are utilized to measure or control the level of liquids in tanks, the flow of other materials in conduits, the thickness of moving webs or sheets of rubber, steel or other materials and for various other applications.

The Homer and Stock U.S. Pat. No. 3,551,672 discloses generally an improved alarm system for indicating a reduction in the flow of material such as coal through a conduit. The patent discloses particularly an improved method and apparatus for discriminating between different rates of radiation in which quicker and more reliable response can be obtained than is possible with prior systems embodying radiation sources of similar intensity.

According to the method disclosed in that patent, the number of pulses received by the detector are not merely counted during a predetermined length of time to indicate the intensity of radiation penetrating the conduit and, therefore, the amount of material in the conduit. Instead, the time interval between a radiation pulse and the immediately preceding pulse is utilized to obtain additional information concerning the pulse rate. The time interval between radiation pulses is measured by comparing the interval between successive pulses to a predetermined but variable or adjustable interval. An electrical pulse, referred to as a down pulse, is provided to correspond to each radiation pulse occurring at an interval greater than the predetermined interval, and an electrical pulse, referred to as an up pulse, is provided for each radiation pulse occurring at an interval less than a predetermined interval. These up pulses and down pulses are then constantly counted and balanced against each other, and a predominance of one type of pulse over the other is utilized to give an alarm or an indication of radiation level, or to effect a control.

The present invention is directed to improvements in the alarm system disclosed in the Homer and Stock patent and in particular portions thereof. While the invention disclosed herein is directed particularly to improvements in apparatus for measuring the amount of material in a conduit it will be appreciated that it is capable of other and more general uses.

A characteristic of the apparatus disclosed in the Homer and Stock patent for providing up pulses and down pulses is that only one up pulse or one down pulse is provided for each incoming pulse. Since it is the down pulses that occur when the incoming pulses are spaced at longer intervals it requires a longer period of time for the bidirectional counter (the means disclosed for balancing the up pulses against the down pulses) to be counted down than to be counted up. One aspect of the present invention is the provision of improved method and apparatus by which down pulses are provided at a minimum rate, i.e. at maximum intervals, even if incoming radiation pulses are very infrequent. In effect the down pulses are weighted more and more heavily against the up pulses as the interval between successive radiation pulses is increasingly longer than the predetermined interval.

Other aspects of the present invention are the provision of a novel high voltage power supply for devices such as Geiger tubes and the provision of the variable impedance clamping circuit which presents different impedances to incoming signals depending upon their amplitude.

SUMMARY OF THE INVENTION

A general object of this invention is the provision of improvements in the method and apparatus disclosed in Homer and Stock U.S. Pat. No. 3,551,672 for measuring the amount of material in a conduit.

A particular object is the provision of improved method and apparatus for discriminating between different rates of random pulses in which low pulse rates may be detected more quickly.

Another object is the provision of such a method and apparatus in which pulse rates that are nearly equal may be distinguished more precisely.

Yet another object is the provision of a clamping circuit that presents a very high impedance to incoming pulses of very low amplitude and less impedance to pulses of greater amplitude and clamps very large pulses to an acceptable maximum voltage.

Still another object is the provision of a high voltage D.C. power supply that is more compact and less expensive than prior such supplies, and that includes a novel filter arrangement for reducing A.C. components in the output voltage without the use of capacitors of very large values and large size.

One aspect of the invention involves an improvement in a method and apparatus for determining average rates of occurrence of random pulses by comparing the time intervals between successive random pulses with a predetermined time interval and producing a first signal when the interval between successive random pulses is greater than the predetermined interval. A second signal is produced instead of the first signal and distinct therefrom when the interval between successive random pulses is less than the predetermined interval. The first signals are balanced against the second signals and a preponderance of one signal over the other is used to provide an output signal. The improvement includes weighting the first signals increasingly in accordance with the amount by which the interval between successive random pulses exceeds the predetermined interval. Preferably the first and second signals and the weight is accomplished by providing the first pulses at intervals no greater than a predetermined maximum interval.

This invention also includes an improved interval discriminator which compares the intervals between successive random pulses to a predetermined interval and provides an electrical down pulse if the interval is greater than the predetermined interval and an electrical up pulse if the interval is less than the predetermined interval. The interval discriminator includes means for providing electrical down pulses at maximum intervals when the random pulses occur at intervals greater than the predetermined interval.

Another aspect of the invention involves the provision of a high voltage D.C. power supply including means for providing a rectified alternating voltage, means for regulating the rectified voltage and means for filtering the regulated and rectified voltage. The filtering means includes an output filter capacitor, a zener diode connected between the regulating means and the output capacitor to clamp the capacitor to the peak voltage across the regulator means and thereby increase the filtering effect of the output capacitor. A bleeder resistor is connected to provide a discharge path for the output capacitor through the zener impedance of the zener diode when the power supply is turned off.

Yet another aspect of the invention resides in a circuit for providing a variable impedance to an input signal of predetermined polarity in accordance with its amplitude comprising a zener diode and a conventional diode connected in series so that the zener diode is reverse biased and the conventional diode is forward biased. The series diodes clamp the input signal to a predetermined maximum level for input signals greater than the maximum level and provide increasing impedance to signals of amplitude less than the maximum level.

BRIEF DESCRIPTION OF THE DRAWINGS

In the drawings:

FIG. 1 is a combined block and schematic diagram illustrating apparatus embodying the invention particularly as applied to a coal flow alarm.

FIG. 2 is a block diagram showing a preferred form of improved interval discriminator.

FIG. 3 is a block diagram showing an alternate form of improved interval discriminator.

FIG. 4 is a schematic diagram of the variable impedance clamping circuit.

FIG. 5 is a diagram illustrating the individual and combined high frequency voltage-current characteristic curves of the silicon diode and the zener diode in the variable impedance clamping circuit of FIG. 4.

DESCRIPTION OF THE PREFERRED EMBODIMENT

The invention is disclosed herein as applied to a coal flow alarm that gives an indication and, if desired, actuates controls if there is a substantial reduction in the amount of coal in a conduit through which coal is flowing downwardly. The apparatus illustrated in FIG. 1 is basically the same system as that described in Homer and Stock U.S. Pat. No. 3,551,672 but incorporate improvements therein that were noted above and will be described in detail below.

As shown in FIG. 1, the apparatus is associated with a conduit 10 that is normally full of coal moving downwardly, ultimately to be supplied to a furnace. An appropriately shielded radiation source 11 is disposed on one side of the conduit. On the other side of the conduit, there is a radiation detector in the form of Geiger tube 12. Radiation pulses passing through conduit 10 are detected by the Geiger tube and are transmitted in the form of electrical pulses through cable 13, which varies in length according to the particular installation, to a variable impedance clamping circuit 14. Geiger tube 12 is energized from a high voltage D.C. power supply 15 that is connected to cable 13 through a cable 17 adjacent to the connection of cable 13 to variable impedance clamping circuit 14. The high voltage power supply 15 will be described more fully below.

Variable impedance clamping circuit 14 embodies a circuit that presents a variable impedance to incoming pulses according to their amplitude and will be described more fully below. The pulse amplifier and shaper 19 receives the pulses from variable impedance clamping circuit 14 and amplifies and shapes them to a constant height. Pulses from pulse amplifier and shaper 19 are transmitted through line 20 to an interval discriminator 22 which produces up pulses on line 24 or down pulses on line 25 according to whether the incoming pulses follow the preceding pulse in line 20 by an interval less than or greater than a predetermined interval. Up pulses in line 24 and down pulses in line 25 are transmitted to a bidirectional counter 28 where up pulses are caused to increment the counter and down pulses are caused to decrement the counter.

So long as the proper amount of coal is flowing in conduit 10 the number of up pulses will be less than the number of down pulses and the bidirectional counter 28 will tend to remain within a relatively few counts from the bottom of its count range. If there is insufficient coal in the conduit 10, more radiation pulses will be transmitted therethrough and the end result will be that more up pulses will be developed and cause bidirectional counter 28 to count up to a predetermined count which will be detected by count detect circuit 30 and an alarm 31 actuated to indicate that there is insufficient coal in the conduit 10.

As long as there is insufficient coal in conduit 10 up pulses will continue to be produced and bidirectional counter 28 will be maintained near the top of its count range. As more coal is supplied to conduit 10 to correct the insufficiency thereof less radiation is transmitted through conduit 10 and detected by Geiger tube 12 with the result that fewer up pulses and more down pulses are produced. The down pulses cause bidirectional counter 28 to count down and to be restored to its normal counting range.

The operation described above along with method and apparatus for carrying it out is described fully in Homer and Stock U.S. Pat. No. 3,551,672 and the disclosure of that patent is hereby incorporated herein by reference.

From the foregoing description it will be appreciated that a very high radiation rate results not only in a preponderance of up pulses over down pulses but also in very rapid counting upward in the bidirectional counter. However, for very low radiation rates, the down pulses will predominate but be spaced so far apart in time that counting downward in the bidirectional counter will be slow.

This invention greatly enhances the response characteristics of the system for very low radiation rates by increasing the weight of the down pulses in accordance with the amount by which the interval between successive random radiation pulses exceeds the predetermined interval. Preferably this is accomplished by providing an interval discriminator 22 that generates down pulses at a minimum rate despite the lack of or low rate of incoming pulses to the interval discriminator. Furthermore, these more symmetrical response characteristics to high and low radiation rates result in a device that is distinctly more capable of distinguishing between levels of radiation that are close together.

Improved interval discriminators for accomplishing this result are shown in FIGS. 2 and 3 and identified as 22a and 22b, respectively. Referring first to FIG. 2, the output pulse from the pulse amplifier and shaper 19 is fed through a brief time delay 33, which may delay the pulse for about 50 microseconds, to the set input 34 of a flip-flop 35. When the flip-flop 35 is in the set condition, its output renders permissive the AND gate 37 through line 38. Pulses on incoming line 20 are also fed to variable rate pulse generator 40 which is identical to variable rate pulse generator 26 in Homer and Stock U.S. Pat. No. 3,551,672. The pulses have the effect of inhibiting and resetting the variable rate pulse generator 40 precisely as described in the Homer and Stock patent. When not so inhibited and reset, the variable rate pulse generator 40 supplies a continuing sequence of pulses, separated by a preset but adjustable time interval, on reset line 42 of flip-flop 35 and on line 25. The pulses on line 25 are down pulses and are transmitted to bidirectional counter 28 to decrement it. Pulses are also transmitted through line 42 to flip-flop 35 to reset the flip-flop or to maintain it reset. When flip-flop 35 is reset, AND gate 37 is not permissive and no up pulses are produced on line 24. Down pulses on line 25 are thus produced at a predetermined minimum rate, i.e., at predetermined maximum intervals, as determined by the rate of pulses from pulse generator 40.

FIG. 3 shows an alternate form of an interval discriminator identified as 22b. Again, the output pulses from the pulse amplifier and shaper 19 are fed through the brief delay 33 to the set input 34 of flip-flop 35. When the flip-flop is in the set condition, its output renders permissive the AND gate 37 through line 38. Pulses on incoming line 20 are also fed to variable rate pulse generator 40 for the same purpose as described above in connection with FIG. 2. In this case, however, output pulses from pulse generator 40 are supplied not only to reset input 42 of flip-flop 35 but also through line 45 to one input of an OR gate 46. The reset output of flip-flop 35 is connected through line 47 to one input of an AND gate 48 which has its remaining input connected to line 20. The output of AND gate 48 is connected to the remaining input of OR gate 46.

In the circuit of FIG. 3 up pulses are produced in the same manner as in the circuit of FIG. 2. Down pulses are produced in the circuit itself at a minimum rate, i.e., at maximum intervals, determined by the repetition rate of pulse generator 40. Added to the down pulses generated at the minimum rate are incoming pulses in line 20 that follow a preceding pulse by an interval greater than the interval between pulses from pulse generator 40. These pulses are passed through AND gate 48 and OR gate 46 and are added to the down pulses produced by pulse generator 40 to increase the rate of down pulses in line 25.

The ultimate result of the improved interval discriminators 22a and 22b is to be able to distinguish better between two levels of radiation which are fairly close together, that is, to be able to distinguish the two levels of radiation more quickly or to be able to distinguish the rates with lower probability of an error. Another advantage of the additional down pulses produced by the circuits is that in the event of extremely low received rates of radiation where essentially all incoming pulses are spaced much farther apart than the characteristic time interval of pulse generator 40, circuits 22a and 22b provide down pulses at a predetermined minimum rate, rather than giving very few down pulses spaced farther apart. Thus, the bidirectional counter 28 can count down rapidly when a low rate of radiation is detected as well as being able to count up rapidly when a high rate of radiation is detected.

Bidirectional counter 28 and count detection circuit 30 (FIG. 1) provide a simpler alarm control arrangement than that disclosed in Homer and Stock U.S. Pat. No. 3,551,672. In the Homer and Stock patent, the bidirectional counter has a high count position which causes an alarm to be given. Alternate ways are shown for turning off the alarm. One way that the alarm is turned off is by the counter counting down to a low count position. Alternately the alarm is turned off after the counter has counted down below the high count position and remained there for a predetermined time.

In FIG. 1 herein, the bidirectional counter 28 and count detect circuit 30 are arranged so that an "alarm state" exists at or above a predetermined count of the bidirectional counter and actuates the alarm 31. This provides a particularly simple bidirectional counter and associated alarm arrangement since only enough logic circuits are required to detect the "alarm state" of the counter and actuate the alarm 31. The alarm is turned off automatically when the bidirectional counter drops below the predetermined count range of the "alarm state".

As discussed above, another aspect of this invention resides in the provision of an improved high voltage D.C. power supply which, as illustrated here, is used to supply high voltage to Geiger tube 12. This improved power supply is shown in FIG. 1 and includes a transformer 61 having its primary winding 62 connected to a source of alternating voltage (not shown) and its secondary winding 63 connected to a full wave rectifier in the form of diodes 64 and 65. Secondary winding 63 is provided with a center tap that is grounded.

The unfiltered full wave rectified power supply so far described is completely conventional and is not, per se, a part of the improvement of this invention. The basic unfiltered power supply shown may be replaced by, for example, a half wave rectified supply or a voltage doubler type supply or any other suitable basic power supply.

The improved high voltage D.C. power supply includes a filter circuit comprising filter capacitors 71 and 72, a regulating circuit including current limiting resistor 74 and zener diode 75, bleeder resistor 77, and clamping zener diode 79. In a conventional high voltage D.C. power supply bleeder resistor 77 would be connected directly across the output filter capacitor 72 to discharge that capacitor when the supply is turned off and clamping zener diode 79 would not be present.

In the power supply 15 of FIG. 1 the output voltage is regulated by zener diode 75 and current limiting resistor 74, and the voltage is filtered by capacitors 71 and 72 along with zener diode 79. The voltage across zener diode 75 has a significant A.C. voltage component of "ripple" or noise superimposed upon it due to the zener impedance of zener diode 75. Output filter capacitor 72 is charged to the peak value of the voltage across regulating zener diode 75 through zener diode 79 which clamps capacitor 72 to that value. The power supply thus provides a well regulated filtered output voltage on line 17 which is connected to cable 13 that leads to Geiger tube 12.

When power supply 15 is turned off output capacitor 72 will be charged to the peak output voltage of the supply and, because of the high voltage involved, must be discharged to prevent hazardous shocks to personnel. Since diode 79 is a zener diode, capacitor 72 can discharge through its zener impedance and through bleeder resistor 77. The zener voltage of zener diode 79 can be quite low compared to the zener voltage of regulating zener diode 75 and need only be higher than the peak-to-peak value of the A.C. component of voltage across zener diode 75 when the power supply is in operation. When the power supply is turned off output capacitor 72 will thus discharge to the zener level of zener diode 79. Since this zener level is quite low the residual voltage across capacitor 72 is not sufficient to cause harm and will eventually leak off.

It has previously been proposed to use a conventional diode in the position of the zener diode 79 in low voltage power supplies, which do not require a bleeder resistor. Since it is necessary with a high voltage supply to discharge output filter capacitor 72, it is necessary, if zener diode 79 is to be replaced by a conventional diode, to connect bleeder resistor 77 directly across capacitor 72. In that case, however, bleeder resistor 77 detracts from the filtering effect of the diode and capacitor 72. The filtering circuit in power supply 15 thus accomplishes filtering in a very efficient manner while still allowing output capacitor 72 to be discharged through a bleeder resistor to a safe voltage level when the power supply is turned off.

A particular advantage of this power supply is that it can be made relatively inexpensively and in a compact package. This is so because filter capacitors 71 and 72 can be relatively small in capacitance value and, therefore, in physical size and cost because of the filtering effect provided by zener diode 79. In a particular example of a high voltage D.C. power supply constructed in accordance with this invention and designed to produce a 600 volt output voltage, filter capacitors 71 and 72 are each 0.1 microfarads. Current limiting resistors 74 has a value of 120,000 ohms and bleeder resistor 77 has a value of 44 Megohms. Regulating zener diode 75 includes three zener diodes type 1R200A manufactured by Solitron Corporation, each diode having a zener voltage of 200 volts, and zener diode 79 is a type 1N751A and has a zener breakdown voltage of 5 volts.

Another aspect of the present invention resides in the provision of a variable impedance clamping circuit which provides a variable impedance to pulses transmitted through cable 13 according to their amplitude. A wide variation in amplitude of input pulses from Geiger tube 12 results from the widely different lengths of cable 13 that may exist in different installations and the fact that Geiger tube 12 has a high source impedance.

As shown in FIG. 1, Geiger tube 12 is connected to voltage supply 15 through cables 13 and 17 and resistors 90 and 91. Resistor 90 protects and assists in the operation of the Geiger tube and may have a value in the order of 10 Megohms. Resistor 91 is a voltage dividing resistor which divides the signal from Geiger tube 12 so that a portion thereof is available at the input to variable impedance clamping circuit 14. Because of the high source resistance of Geiger tube 12 including resistor 90 and because of distributed capacitance in cable 13, signals presented to the input of variable impedance clamping circuit 14 can be attenuated to a value as small as ½ volt or less when cable 13 is especially long. On the other hand when cable 13 is relatively short, pulses delivered to the input of variable impedance clamping circuit 14 may have amplitudes on the order of 40 volts.

Pulses in line 13 occur typically between 10 and 1,000 times per second and have durations in the order of a few microseconds. They contain frequency components principally in the range of about 1 megacycle per second. The pulses are negative going and are generally accompanied by low frequency noise.

It is desirable to attenuate or clamp the large amplitude signals to a lower level that is more acceptable to solid state electronic components. On the other hand, the clamping or attenuating circuit must not appreciably load input signals of very low amplitudes such as those of about ½ volt. To solve this problem there is provided variable impedance clamping circuit 14 which presents a variable impedance to input pulses, being relatively low for signals of large amplitude and relatively high for signals of very small amplitude. Signals of large amplitude are thus reduced in amplitude, if not actually clamped to a lower voltage, while signals of low amplitude are not. Variable impedance clamping circuit 14 and the manner in which it operates to accomplish its purpose is described below with reference to FIGS. 4 and 5.

Referring to FIG. 4, pulses in cable 13 are initially passed through coupling capacitor 92 and then through a high pass filter which includes capacitor 100 and resistor 101 to reduce the low frequency noise. A clamping diode 104 clamps the voltage at its anode to ground so that only negative pulses are passed. The heart of the variable impedance clamping circuit is a zener diode 106 and a conventional, preferably silicon, diode 108 connected in series so that the zener diode is reverse biased and the conventional diode is forward biased. The resistor 19a connected as shown in FIG. 4 represents the input impedance of pulse amplifier and shaper 19 (FIG. 1). Input signals of very large amplitude could damage electrical components in the amplifier and pulse shaper 19. Signals of large amplitude are reduced to the desired level by zener diode 106 which clamps them to its zener breakdown voltage, preferably on the order of 5 to 10 volts.

For signals of very small amplitude the high frequency impedance of zener diode 106 is undesirably small compared to the source impedance of Geiger tube 12 and the input impedance 19a of pulse amplifier and shaper 19. A principal reason for low impedance of the zener diode is the effect of shunt capacitance of the zener diode at the frequencies present in the incoming pulses. For small amplitude signals zener diode 106 would thus provide too great a load and could attenuate such signals to such an extent that they could not be detected by pulse amplifier and shaper 19. To remedy this situation the conventional diode 108, preferably a silicon diode, is connected as shown in series with zener diode 106. The effect of the diode is to add its small forward impedance in series with the small signal zener impedance of zener diode 106. Since the forward impedance of diode 108, including the effect of its shunt capacitance, is much larger for small signals than is the zener impedance of zener diode 106 including its shunt capacitance, the impedance of the series combination for small signals is substantially the forward impedance of diode 108.

Signals having amplitudes above the zener voltage of zener diode 106, however, are essentially not affected by the presence of diode 108. For signals that are larger than ¼ to ½ volt and lower than the zener voltage of zener diode 106 the series combination of diode 108 and zener diode 106 presents a shunt impedance that decreases as the amplitude of the signal increases. The combination of zener diode 106 and diode 108 is thus a very high impedance to very small signals and gradually decreasing impedance to larger signals until finally quite large signals are clamped by zener diode 106 to its zener voltage level.

The above characteristics are illustrated in FIG. 5 in which the forward voltage-current characteristic curve for the frequencies in question for a silicon diode is superimposed upon the voltage-current characteristic for the frequencies in question for a zener diode. Dot-dash curve 110 represents the forward characteristic of silicon diode 108 while dashed line curve 112 represents the zener characteristic of zener diode 106. The solid curve 114 represents the characteristic of the series combination of silicon diode 108 and zener diode 106 at the frequencies in the incoming pulses. It will be noted at portion 115 of the curve of the series combination 114 that for very low amplitude signals the current flow is controlled by the impedance of silicon diode 108 and is quite low. For signal amplitudes above the saturation voltage level (about ½ volt) of silicon diode 108, however, the characteristic 112 of zener diode 106 is dominant and diode 108 has essentially no effect.

In a specific example of a circuit constructed in accordance with FIG. 4 coupling capacitor 92 has a value of 1,000 picofarads, filter capacitor 100 has a value of 390 picofarads and resistor 101 has a value of 100,000 ohms. Resistor 19a which represents the input impedance of pulse amplifier and shaper 19 is about 2 Megohms. Clamping diode 104 and compensating diode 108 are each type 1N458A and zener diode 106 is a type 1N751A and has a zener breakdown voltage of 5 volts.

The shunt capacitance of compensating diode 108 in this example is about 5 picofarads and of the zener diode 106 is about 450 picofarads. The D.C. impedance of zener diode 106 alone at 2 ½ volts is about 360,000 ohms and of the series combination of diode 108 and zener diode 106 is about 2 Megohms. With a one megahertz sinusoidal signal of 0.2 volts peak to peak applied to coupling capacitor 92, the output signal voltage as measured across resistance 19a is down 9 decibels if only zener diode 106 is in the circuit. Under the same conditions but with diode 108 included, the output signal voltage is down only 0.4 decibels. When the same tests are run with a 10 volt peak to peak input signal, the output is down 5 ½ decibels without diode 108 and 3.4 decibels with diode 108.

While a preferred form of this invention has been specifically disclosed and described herein it will be apparent to those skilled in the art that various modifications may be made without departing from the scope of this invention. Accordingly, the invention is not to be limited to the form herein specifically disclosed nor in any other way inconsistent with the advance in the art promoted by this invention.

What is claimed is:

1. In a method for determining average rates of occurrence of random pulses which includes the steps of comparing the time intervals between successive random pulses with a predetermined time interval, producing a first signal when the interval between successive random pulses is greater than the predetermined interval, producing a second signal instead of the first signal and distinct therefrom when the interval between successive random pulses is less than the predetermined interval, balancing the first signals against the second signals and utilizing a preponderance of one signal over the other to provide an output signal, the improvement which comprises increasing the weight of said first signals in accordance with the amount by which the interval between successive random pulses exceeds the predetermined interval.

2. The improvement as in claim 1 wherein said first and second signals are pulses and the weight of said first pulses is increased by providing said first pulses at intervals no greater than a predetermined maximum interval.

3. In a method for determining average rates of occurrence of random pulses which includes the steps of comparing the time intervals between successive random pulses with a predetermined time interval, classifying pulses that follow a preceding pulse by an interval greater than the predetermined time interval in a first category, classifying pulses that follow a preceding pulse by an interval less than the predetermined time interval in a second category, balancing pulses in one of the categories against the pulses in the other and utilizing a preponderance of pulses in one of the categories over the other to provide an output signal, the improvement which comprises producing pulses for said first category distinct from said random pulses and at predetermined maximum intervals when said random pulses occur at intervals greater than said predetermined time interval whereby pulses for said first category occur at a predetermined minimum rate even when the interval between successive random pulses is very long.

4. The improvement of claim 3 wherein said maximum interval is equal to said predetermined time interval.

5. The improvement of claim 3 wherein the pulses in said first category are balanced against the pulses in said second category by storing the number of pulses in said second category less the number of pulses in said first category to provide a stored difference between the pulses in said second category and the pulses in said first category, and providing an output signal when the stored difference reaches a predetermined value.

6. A method for determining average rates of occurrence of random pulses which includes the steps of comparing the time interval between successive random pulses with a predetermined time interval, producing a first pulse at said predetermined intervals when the interval between successive random pulses is greater than the predetermined interval, producing a second pulse instead of a first pulse and distinct therefrom when the interval between successive random pulses is less than the predetermined interval, balancing the first pulses against the second pulses and utilizing a preponderance of one pulse against the other to provide an output signal.

7. In a method for discriminating between rates of random pulses derived from emissions by radioactive materials which includes the steps of detecting the random pulses, comparing the time interval between each detected random pulse and the random pulse immediately preceding it to a predetermined but variable interval, providing in a first path an electrical pulse corresponding to a detected pulse occurring at an interval greater than the predetermined interval, providing in a second path an electrical pulse corresponding to a detected pulse that follows a preceding pulse by an interval less than the predetermined time interval, storing said electrical pulses, electrical pulses through one path increasing the number of pulses in the store and electrical pulses through the other path decreasing the number of pulses in the store, and giving an output signal when the number of pulses in the store reaches a predetermined number, the improvement which comprises producing an electrical pulse in said first path at predetermined maximum intervals when said random pulses occur at intervals greater than said predetermined interval whereby electrical pulses in said first path occur at a predetermined minimum rate even when the interval between successive random pulses is very long.

8. In apparatus for determining rates of occurrence of random pulses comprising an interval discriminator for comparing the intervals between successive random pulses to a predetermined interval and for providing an electrical down pulse to correspond to each random pulse occurring at an interval greater than the predetermined interval, and an electrical up pulse for each random pulse occurring at an interval less than the predetermined interval, and means for storing said up and down pulses so that up pulses increment said storage means and down pulses decrement said storage means, said storage means providing an output signal when a predetermined stored difference between up pulses and down pulses is reached, the improvement which comprises means included in said interval discriminator for providing an electrical down pulse at predetermined maximum intervals when said random pulses occur at intervals greater than the predetermined interval, whereby said electrical down pulses occur at a predetermined minimum rate even when the interval between successive random pulses is very long.

9. An interval discriminator for producing first and second pulses indicating the time interval between successive random pulses comprising a flip-flop, a variable rate pulse generator connected to the reset input of said flip-flop, said pulse generator having an inhibit input, a delay circuit connected to the set input of said flip-flop, the input to said delay circuit and the inhibit input to said variable rate pulse generator being connected together and to said incoming random pulses, each random pulse inhibiting said variable rate pulse generator and setting said flip-flop which remains set until the interval between consecutive random pulses is longer than the interval between pulses from the variable rate pulse generator, and an AND gate enabled by the set state of said flip-flop to pass incoming random pulses and thereby provide first pulses indicating that the interval between successive random pulses is less than the interval between pulses from said variable rate pulse generator, said pulse generator providing second pulses at its selected interval when the interval between successive random pulses is greater than its selected interval, whereby said first and second pulses may be balanced to determine the rate of incoming random pulses.

10. The interval discriminator as claimed in claim 9 including a second AND gate enabled by the reset state of said flip-flop to pass incoming random pulses indicating the the interval between successive random pulses is greater than the interval between pulses from said variable rate pulse generator, and an OR gate connected to receive pulses from said second AND gate and from said pulse generator, whereby said OR gate provides pulses corresponding to incoming random pulses that follow a preceding random pulse by an interval greater than the predetermined interval at intervals corresponding to the rate of occurrence of such pulses but at maximum intervals corresponding to the selected pulse rate of said variable rate pulse generator.

* * * * *